United States Patent
Hoelzle et al.

(10) Patent No.: US 9,986,392 B1
(45) Date of Patent: May 29, 2018

(54) DELIVERING SHORT MESSAGE SERVICE (SMS) MESSAGES VIA AN INTERNET PROTOCOL MULTIMEDIA SUBSYSTEM (IMS)

(71) Applicant: Sprint Spectrum L.P., Overland Park, KS (US)

(72) Inventors: Sean P. Hoelzle, Collegeville, PA (US); George Dohanich, Cary, NC (US); Russell E. Huntsman, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days. days.

(21) Appl. No.: 15/340,845

(22) Filed: Nov. 1, 2016

(51) Int. Cl.
| | |
|---|---|
| *H04W 4/14* | (2009.01) |
| *H04W 8/24* | (2009.01) |
| *H04W 8/02* | (2009.01) |
| *H04L 29/06* | (2006.01) |
| *H04W 80/04* | (2009.01) |
| *H04W 88/16* | (2009.01) |

(52) U.S. Cl.
CPC ........... *H04W 4/14* (2013.01); *H04L 65/1073* (2013.01); *H04W 8/02* (2013.01); *H04W 8/24* (2013.01); *H04L 65/1016* (2013.01); *H04W 80/04* (2013.01); *H04W 88/16* (2013.01)

(58) Field of Classification Search
CPC ........... H04W 4/14; H04W 8/02; H04W 8/24; H04W 80/04; H04W 88/16; H04L 65/1073; H04L 65/1016
USPC .......................................................... 455/466
See application file for complete search history.

(56) References Cited

U.S. PATENT DOCUMENTS

| | | | | |
|---|---|---|---|---|
| 2002/0151305 | A1* | 10/2002 | Ward ...................... | H04W 4/02 455/436 |
| 2007/0032251 | A1* | 2/2007 | Shaheen ................. | H04L 51/38 455/466 |
| 2010/0331023 | A1* | 12/2010 | Cai ......................... | H04L 51/38 455/466 |
| 2014/0003411 | A1 | 1/2014 | Shaheen | |
| 2017/0347304 | A1* | 11/2017 | Kodaypak ............. | H04W 40/02 |

* cited by examiner

*Primary Examiner* — Marisol Figueroa

(57) ABSTRACT

Disclosed is a method and system to help avoid performing third-party registration of a UE with an SMS gateway of an IMS, the IMS including a P-CSCF, an S-CSCF, and an HSS. In an example implementation, when registering for service with the IMS, the UE provides UE-capability data to the P-CSCF, the P-CSCF sends the data to the S-CSCF, and the S-CSCF sends the data to the HSS. The S-CSCF does not send the UE-capability data to the SMS gateway. Rather, when the SMS gateway receives a request to send an SMS message to the UE, the SMS gateway queries the HSS to obtain the UE-capability data. Based on the UE-capability data, the SMS gateway makes a determination of whether the UE is capable of receiving SMS messages over IP and routes the SMS message over an appropriate access network based on the determination.

20 Claims, 4 Drawing Sheets

DELIVERING SHORT MESSAGE SERVICE (SMS) MESSAGES VIA AN INTERNET PROTOCOL MULTIMEDIA SUBSYSTEM (IMS)

BACKGROUND

A typical communication system includes a plurality of access networks each configured to provide client devices with connectivity to various transport networks and service platforms. These access networks may serve client devices over wired and/or wireless channels, to facilitate circuit-switched and/or packet-switched communication of various forms. By way of example, a communication system may include multiple radio access networks (RANs) each configured to provide user equipment devices (UEs), such as cell phones or other wirelessly-equipped devices, with connectivity to one or more transport networks such as the public switched telephone network (PSTN) and/or the Internet for instance, and to provide UEs with connectivity to one or more telephony and messaging service platforms.

A representative communication system, for instance, may include two access networks, one that functions primarily to provide client devices with access to engage in packet-switched communications such as Internet Protocol (IP) based communications, and another that functions primarily to provide client devices with access to engage in circuit-switched communications such as legacy voice calling services. For example, the first access network may be a Long Term Evolution (LTE) network, which functions primarily to provide UEs with access to engage in high speed packet-data communications, and the second access network may be a legacy Code Division Multiple Access (CDMA) or Global System for Mobile Communications (GSM) network, which functions primarily to provide UEs with access to engage in voice calls. Other examples are possible as well.

In such an arrangement, both access networks may connect with a common media system that is configured to handle message communication, such as Short Message Service (SMS) communication, to and from served devices. For instance, both access networks may connect with an IP multimedia subsystem (IMS), and the IMS may include an SMS gateway that is configured to receive, store, and forward SMS messages to UEs served by either access network. In practice, the SMS gateway could be configured to use different types of routing mechanisms for transmitting SMS messages to UEs via the different access networks. For example, the SMS gateway could be configured to use the well-known Session Initiation Protocol (SIP) for routing SMS messages to UEs via access networks that provide UEs with packet-switched communication service, and the SMS gateway could be configured to use the well-known IS-41 signaling protocol for routing SMS messages to UEs via other, legacy access networks.

OVERVIEW

In a representative arrangement as described above, once a UE attaches to an access network, the UE could also register for service with an IMS via the access network. In practice, the UE could send a registration message to a proxy call session control function (P-CSCF) of the IMS. The P-CSCF could forward the registration message to a serving call session control function (S-CSCF) of the IMS, and the S-CSCF could responsively query a home subscriber system (HSS) of the IMS to authenticate the UE. And, upon authentication, the S-CSCF could send a message to the UE, via the P-CSCF, acknowledging registration of the UE with the IMS.

Further, as part of the UE's registration process with the IMS, the UE could send, to the S-CSCF via the P-CSCF, UE-capability data that indicates various capabilities of the UE. For instance, the UE-capability data could take the form of a service flag that indicates whether the UE is capable of receiving SMS messages over an IP access network. Other examples are possible as well. The S-CSCF could then forward the UE-capability data to be stored in the HSS.

After the UE registers with the IMS through the S-CSCF, one or more application servers of the IMS could then provide various services to the UE. One such application server could be an SMS gateway configured to route SMS messages to the UE. In order to assist the SMS gateway in routing SMS messages to the UE, the S-CSCF could engage in third-party registration on behalf of the UE in order to register the UE with the SMS gateway. For instance, the third-party registration could involve the S-CSCF sending a registration message to the SMS gateway to inform the SMS gateway that the UE is accessible via the S-CSCF. Additionally, the S-CSCF could query the HSS to obtain the UE-capability data, and the S-CSCF could forward this data to the SMS gateway. The SMS gateway could then store and refer to the UE-capability data when serving the UE.

As noted above, the SMS gateway could be configured to route SMS messages to the UE over various access networks including an IP access network (e.g., LTE) or a non-IP access network (e.g., CDMA or GSM). In practice, the SMS gateway could determine whether to route SMS messages to the UE over an IP access network or over a non-IP access network based on the UE-capability data provided to the SMS gateway during third-party registration of the UE. For instance, if the UE-capability data indicates that the UE is capable of receiving SMS messages over an IP access network, then the SMS gateway could route SMS messages to the UE over the IP access network. Otherwise, the SMS gateway could route SMS messages to the UE over a non-IP access network, perhaps using the well-known IS-41 signaling protocol, for instance. In some examples, the SMS gateway could route SMS messages to the UE over an IP access network by default, so long as the UE is third-party registered with the SMS gateway. Otherwise, if the UE is not third-party registered with the SMS gateway, then the SMS gateway could route SMS messages to the UE over a non-IP access network. Other examples are possible as well.

Unfortunately, however, performing third-party registration of the UE with the SMS gateway could be problematic for various reasons. For instance, as noted above, the third-party registration process could involve sending a number of messages and other data between the S-CSCF, the HSS, and the SMS gateway. For an IMS that serves numerous UEs, third-party registration of these UEs could result in a substantial increase in traffic routed through the IMS. And this increase could be further exacerbated in scenarios where a large number of UEs engage in third-party registration at or around the same time. Such scenarios could include a large number of users powering on their UEs or entering into network coverage somewhat simultaneously (e.g., at the conclusion of a concert or sporting event). Other examples are possible as well.

Further, third-party registration of the UE with the SMS gateway could be problematic because, as noted above, it could involve maintaining the UE-capability data in two separate databases—namely, the HSS and the SMS gateway. Storing the UE-capability data in separate databases creates a possibility that the two databases could fall out of sync, for instance, if the UE-capability data is updated in one database but not the other. By way of example, the UE could provide updated UE-capability data to the P-CSCF, the P-CSCF could pass the updated data to the S-CSCF, and the S-CSCF could update the UE-capability data stored in the HSS. If a similar update is not provided to the SMS gateway, then the SMS gateway could contain erroneous UE-capability data. And if the UE-capability data stored in the SMS gateway is erroneous, then the SMS gateway could attempt to route an SMS message to the UE in a manner that is incompatible with the UE's capabilities. This could result in multiple transmission attempts, thereby causing undesirable delays during the transmission of the SMS message.

Still further, UE-capability data that is provided to an SMS gateway as a result of third-party registration of a UE might not accurately indicate whether the UE is capable of receiving SMS messages over a particular access network. For instance, the UE-capability data could identify a model name or number of the UE, such that the model name or number could be used to determine whether the UE is of a type capable of receiving SMS messages over a particular access network. Relying on a model type of the UE to determine whether the UE is capable of receiving SMS messages over a particular access network could be problematic, however, if the UE is not actually set up to receive (e.g., provisioned with or currently executing program instructions for facilitating the receipt of) SMS messages over the particular access network.

Disclosed herein is a method and system to help address these or other issues. In an example implementation, when a UE registers with an IMS, the UE sends UE-capability data to a P-CSCF of the IMS. The P-CSCF passes the UE-capability data to an S-CSCF, and the S-CSCF passes the UE-capability data to an HSS. Unlike in conventional systems, after the UE registers with the IMS, the S-CSCF does not engage in third-party registration of the UE with an SMS gateway of the IMS. As such, the S-CSCF does not send a registration message on behalf of the UE to the SMS gateway and does not send the UE-capability data for the UE to the SMS gateway. Rather, when the SMS gateway receives a request to transmit an SMS message to the UE, the SMS gateway will query the HSS to obtain the UE-capability data provided by the UE as part of the UE's IMS registration, and, based on the UE-capability data, the SMS gateway will determine whether to route SMS messages to the UE over an IP access network or over a non-IP access network.

Further, the UE-capability data that the UE provides during its IMS registration and that the SMS gateway obtains from the HSS could indicate whether the UE is actually set up to receive SMS messages over a particular access network, such as by indicating whether the UE is provisioned with program instructions for facilitating the receipt of SMS messages over the particular access network and/or whether those program instructions are currently being executed. Based on this UE-capability data, the SMS gateway could thus determine whether the UE is capable of receiving SMS messages over an IP access network or rather a non-IP access network, and the SMS gateway could transmit the SMS message over an appropriate access network based on the result of the determination.

Accordingly, in one respect, disclosed is a method for delivering an SMS message to a UE that is registered with an IMS, the IMS including an application server and an HSS. As disclosed, the method includes the application server receiving a request to provide the SMS message to the UE. The method further includes, responsive to receiving the request, the application server querying the HSS to obtain UE-capability data, where the UE provides the UE-capability data to the IMS during IMS registration, and where the provided UE-capability data is stored in the HSS. The method then includes the application server making a determination, based on the UE-capability data, of whether the UE is capable of receiving SMS messages over IP. And the method also includes performing an SMS transmission process that includes (a) transmitting the SMS message to the UE over an IP access network if the determination is that the UE is capable of receiving SMS messages over IP, and (b) transmitting the SMS message to the UE over a non-IP access network if the determination is that the UE is not capable of receiving SMS messages over IP.

In another respect, disclosed is an IMS that is configured to control routing of SMS messages to a UE. The IMS includes an HSS provisioned with UE-capability data, where the UE provides the UE-capability data to the IMS during IMS registration, and where the provided UE-capability data is stored in the HSS. The IMS further includes an application server operable to route SMS messages via an IP access network and operable to route SMS messages via a non-IP access network. In this arrangement, the application server receives a request to provide an SMS message to the UE and responds to the request by querying the HSS to obtain the UE-capability data. The application server then makes a determination, based on the UE-capability data, of whether the UE is capable of receiving SMS messages over IP. And the application server also performs an SMS transmission process including (a) transmitting the SMS message to the UE over the IP access network if the determination is that the UE is capable of receiving SMS messages over IP, and (b) transmitting the SMS message to the UE over the non-IP access network if the determination is that the UE is not capable of receiving SMS messages over IP.

Still further, in another respect, disclosed is a method for delivering an SMS message to a UE that is registered with an IMS, the IMS including an application server and an HSS. As disclosed, the method includes the application server receiving a request to provide the SMS message to the UE. The method further includes, responsive to receiving the request, the application server determining whether the UE is capable of receiving SMS messages over IP without the application server having received a registration message for registering the UE with the application server. Further, the act of determining whether the UE is capable of receiving SMS messages over IP includes (a) querying the HSS to obtain UE-capability data, where the UE provides the UE-capability data to the IMS during IMS registration, and where the provided UE-capability data is stored in the HSS, (b) making a determination, based on the UE-capability data, of whether the UE is capable of receiving SMS messages over IP, and (c) performing an SMS transmission process. The SMS transmission process includes (i) transmitting the SMS message to the UE over an IP access network if the determination is that the UE is capable of receiving SMS messages over IP, and (ii) transmitting the SMS message to the UE over a non-IP access network if the determination is that the UE is not capable of receiving SMS messages over IP.

These as well as other aspects, advantages, and alternatives will become apparent to those of ordinary skill in the art by reading the following detailed description, with reference where appropriate to the accompanying drawings. Further, it should be understood that the descriptions pro-

DETAILED DESCRIPTION

Figure 1:
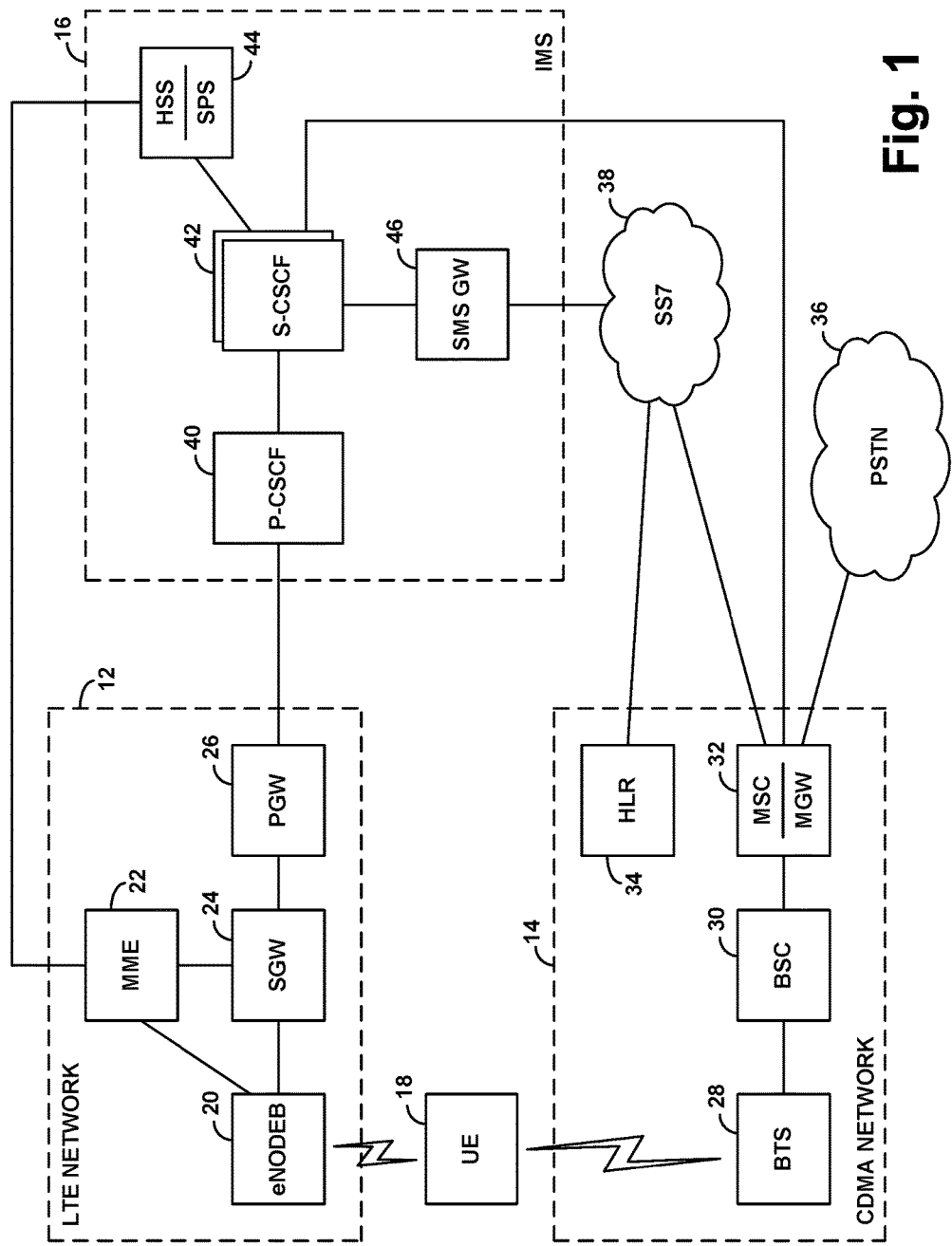
FIG. 1 is a simplified block diagram of an example arrangement in which the present method and system can be implemented.

The present disclosure will focus by way of example on an arrangement including LTE and CDMA access networks and an IMS having an SMS gateway for routing SMS messages. It will be understood, however, that the specifics shown and described are intended only as examples, and that numerous variations are possible. For instance, the principles discussed can be applied in an arrangement involving other types of access networks, other types of media systems, and/or other types of messaging systems. Further, even within the examples disclosed, various elements (e.g. components and/or operations) can be rearranged, distributed, integrated, reordered, omitted, added, and otherwise modified.

Referring to the drawings, as noted above, FIG. 1 is a simplified block diagram of an example arrangement in which the present system and method can be implemented. As shown, the example arrangement includes an example LTE access network 12, an example CDMA access network 14, and an example IMS 16, with the LTE and CDMA access networks each connecting with the IMS and each providing respective wireless coverage in which to serve UEs. Shown within coverage of both access networks is then a representative UE 18.

The example LTE network 12 includes an LTE evolved-Node-B (eNodeB) 20, a mobility management entity (MME) 22, a serving gateway (SGW) 24, and a packet-data network gateway (PGW) 26. In practice, the eNodeB radiates to provide an LTE coverage area in which to serve UEs, the MME serves as a controller for tracking location of UEs, paging UEs, and management of bearer connections for UEs, the SGW and PGW serve as gateways to convey packet-data transmitted to and from the UE, with the PGW providing connectivity with one or more packet-data networks (not shown) and specifically with the IMS.

With this arrangement, when UE 18 initially enters into coverage of the LTE network, the UE could engage in random access and radio-resource-control signaling with the eNodeB to establish a radio-link-layer connection between the UE and the eNodeB. Further, the UE could then engage in attach signaling with the MME via that radio-link-layer connection to register for service with the LTE network. Namely, the UE could transmit an attach request via the eNodeB to the MME, and the UE could engage in signaling to facilitate establishment of one or more bearers for the UE and assignment to the UE of an IP address for engaging in packet-data communication.

In practice, the MME could engage in signaling with an HSS (shown functionally within the IMS in FIG. 1) to determine what bearers to establish for the UE, based on a service profile record for the UE. For instance, the MME could thereby determine to establish for the UE a best-efforts bearer for carrying general packet-data communication to and from the UE and an IMS signaling bearer for carrying IMS signaling, such as SIP messages between the UE and the IMS. The MME could then engage in signaling with the SGW and the eNodeB, with the SGW in turn engaging in signaling with the PGW, to establish each of these bearers. Each established bearer would then extend between the UE and the PGW, with a radio-bearer portion extending between the UE and the eNodeB, and an access-bearer portion extending between the eNodeB and the PGW, thereby enabling the UE to engage in packet-data communication accordingly.

The CDMA network 14, on the other hand, includes a CDMA base transceiver station (BTS) 28, a base station controller (BSC) 30, a mobile switching center (MSC) 32, and a home location register (HLR) 34. In practice, the BTS 28 radiates to provide a CDMA coverage area in which to serve UEs, the BSC controls certain operations of the BTS, and the MSC serves as a controller for paging UEs and provides connectivity with the PSTN 36 for purposes of connecting incoming and outgoing voice calls. In addition, as shown, the MSC also connects with a Signaling System #7 (SS7) signaling network 38, for carrying signaling messages such as call setup messages and SMS messages, and the HLR is also accessible via the SS7 network.

With this arrangement, when a UE initially enters into coverage of the CDMA network, the UE could engage in CDMA registration by transmitting a registration request message on an air interface access channel to the BTS. The registration request message would then pass to the MSC, and the MSC would responsively send a corresponding registration notification to the HLR, to register the fact that the UE is operating in the MSC's serving area. Further, the HLR could responsively provide the MSC with various advanced-intelligent-network (AIN) triggers to facilitate MSC handling of voice call setup for the UE and the like.

The IMS 16 is then shown including various nodes (e.g. computer servers or the like) to facilitate various IMS operations. In particular, the IMS includes a P-CSCF 40, which serves to handle and operate on IMS signaling (e.g., SIP signaling) between the IMS and the LTE network, and one or more S-CSCFs 42, which serve to handle and operate on IMS signaling passing between various nodes of the IMS. Further, the IMS includes an HSS 44, possibly integrated with a subscription profile server (SPS) as shown, which is provisioned with a service profile record respectively for each of various served UEs, indicating service capabilities and other profile attributes per UE. And the IMS includes an SMS gateway (SMS GW) 46, which, as noted above, serves to handle SMS message communication to and from UEs.

As further shown, the IMS has communication interfaces with both the LTE network and the CDMA network. In particular, the P-CSCF of the IMS is shown having a communication interface with the PGW of the LTE network, so as to facilitate signaling communication (e.g., SIP signaling) between the IMS and UEs served by the LTE network. And the SMS GW is shown having a communication interface with the SS7 network, so as to facilitate signaling communication with the MSC, such as SMS message communication for UEs served by the CDMA network.

In practice, the illustrated UE 18 could be configured for dual-radio-LTE (DRLTE) operation, meaning that the UE could have two radios that allow the UE to engage in both LTE and CDMA communication concurrently. Alternatively, UE 18 could be configured for single-radio-LTE (SRLTE) operation, meaning that the UE could have a single radio that can selectively engage in LTE or CDMA communication but would not engage in both LTE and CDMA communication concurrently. Such a UE could be configured to prioritize operation in LTE so that the UE can engage in high speed data communication. Thus, when the UE is in coverage of both the LTE network and the CDMA network as shown, the UE could register (attach) with the LTE network, and the UE could then operate primarily with LTE service, to facilitate packet-data communication. But the UE could also separately register with the CDMA network to facilitate engaging in voice calls served by the CDMA network. Namely, once the UE has registered with the LTE network, the UE could temporarily tune away from LTE to CDMA, register directly with the CDMA network, and then return to LTE service. Further, the UE could then periodically tune away from LTE to CDMA to check for any CDMA page messages or the like, and the UE could tune away from LTE to CDMA to place voice calls when desired.

In addition, once the UE has registered with the LTE network, the UE could also register via the LTE network with the IMS, to enable the UE to then interact with the IMS via the LTE network. In particular, the UE could transmit a SIP REGISTER message via the UE's IMS signaling bearer to the P-CSCF, and the SIP REGISTER message could pass to an S-CSCF designated to serve the UE. The S-CSCF could then query the HSS to authenticate the UE. Upon authentication of the UE, the S-CSCF could send a SIP 200 OK message to the P-CSCF, and the P-CSCF could forward the SIP 200 OK message to the UE via the LTE network.

As part of the UE's registration with the IMS, the UE could also transmit UE-capability data to the P-CSCF, the P-CSCF could pass the UE-capability data to the S-CSCF, and the S-CSCF could then pass the UE-capability data to the HSS for storage, perhaps as part of the UE's profile record. As noted above, the UE-capability data could include information indicative of various capabilities of the UE. For instance, the UE-capability data could indicate whether the UE is capable of receiving SMS messages over an IP access network, such as the LTE network.

In practice, the UE-capability data could indicate a model type of the UE, and the indicated model type could be used to determine the SMS messaging capabilities of the UE. Certain UE model types are known to be capable of receiving SMS messages over an IP access network, while other UE model types are not. As such, if the UE-capability data indicates that the UE is of a model type that is capable of receiving SMS messages over an IP access network, then this could indicate that the UE is capable of receiving SMS messages over an IP access network. Otherwise, if the UE-capability data indicates that the UE is of a model type that is known to be incapable of receiving SMS messages over an IP access network, or if the capabilities of the indicated model type are unknown, then this could indicate that the UE is not capable of receiving SMS messages over an IP access network.

However, as further noted above, the model type of the UE might not always accurately indicate the UE's SMS messaging capabilities. For instance, even if the UE is of a model type that is known to be capable of receiving SMS messages over an IP access network, the UE might not be currently set up to receive SMS messages over IP. For instance, the UE could be lacking appropriate program instructions (e.g., an SMS messaging application or the like) that when executed facilitate the reception of SMS messages over IP. Alternatively, the UE could include such program instructions, but a processor of the UE might not be currently executing the program instructions (e.g., the SMS messaging application could be turned off or otherwise disabled). To address these issues, the UE-capability data could include information that indicates whether the UE includes program instructions that when executed facilitate the reception of SMS messages over IP, and/or the UE-capability data could include information that indicates whether these program instructions are currently being executed by a processor of the UE.

To facilitate this, in an example implementation, the UE could be further configured to occasionally re-register with the IMS in order to transmit updated UE-capability data to the IMS, by again sending a SIP REGISTER message and the updated UE-capability data to the P-CSCF. For instance, the UE could be set to periodically (e.g., every hour or so) engage in such re-registration in order to transmit updated UE-capability data to the IMS. Alternatively, the UE could transmit updated UE-capability data to the IMS by re-registering with the IMS responsive to some event that causes the UE-capability data to change. Examples of such events could include the UE downloading, installing, uninstalling, enabling, or disabling program instructions that when executed facilitate the UE receiving SMS messages over IP. Other examples are possible as well. Responsive to detecting one of these events, the UE could engage in a re-registration process that involves transmitting, to the P-CSCF, updated UE-capability that indicates the detected event. The P-CSCF could pass the updated UE-capability data to the S-CSCF, and the S-CSCF could pass the updated UE-capability data to the HSS.

Further, once the UE has registered or re-registered with the IMS, the S-CSCF could then engage in third-party registration of the UE with one or more other applicable nodes of the IMS, such as the SMS GW, thereby informing each such other node that the UE is accessible via that S-CSCF. As part of the third-party registration, the S-CSCF could query the HSS to obtain the UE-capability data, and the S-CSCF could forward the UE-capability data to the SMS GW. The SMS GW could then store the UE-capability data and refer to the UE-capability data to determine various capabilities of the UE when serving the UE.

With this arrangement, the SMS GW can operate as an SMS server for storing and forwarding SMS messages selectively via the LTE network or the CDMA network, functioning as an IS-41 Short Message Service Center (SMSC) to provide SMS messaging services via SS7 and the CDMA network, and functioning as an IP SMS GW to provide SMS messaging services via the LTE network.

In practice, the SMS GW may receive an SMS message in any of various forms and through various channels. For example, the SMS GW may receive an SMS message as an industry standard Short Message Delivery Point to Point (SMDPP) message via the SS7 network, or the SMS GW may receive an SMS message as a SIP MESSAGE message via an IP network. The received SMS message may carry text to be rendered by a messaging application on the UE and/or may take other forms, including for instance carrying a Multimedia Messaging System (MMS) notification that provides the UE with a network address from which the UE can download multimedia content such as image or video content for rendering by the UE. Further, the SMS message may include a destination address or other information that establishes the UE as a destination of the message, so that the SMS GW can determine by reading the message that the message is destined to a particular UE, and the SMS GW can then work to route the message to that UE.

To transmit an SMS message to a UE, the SMS GW may choose an access network over which to route an SMS message to the UE. When choosing the access network, the SMS GW could refer to the UE-capability data that the SMS GW received during third-party registration in order to determine whether the UE is capable of receiving SMS messages over IP. If the UE-capability data indicates that the UE is capable of receiving SMS messages over IP, then the SMS GW could transmit the SMS message to the UE over the LTE network. Otherwise, the SMS GW could default to transmitting the SMS message to the UE over the CDMA network.

To transmit an SMS message to the UE over the LTE network, the SMS GW may determine which S-CSCF serves the UE, based on which S-CSCF engaged in third party registration with the SMS GW on behalf of the UE, and the SMS GW may then transmit the SMS message to that S-CSCF as a SIP MESSAGE message addressed to the UE. That SIP MESSAGE message may then pass via the P-CSCF to the PGW, along to the SGW, and to the eNodeB serving the UE, and the eNodeB may then transmit the SMS message over the LTE air interface to the UE for receipt and rendering by the UE.

On the other hand, to transmit an SMS message to the UE over the CDMA network, the SMS GW may determine which MSC serves the UE, by sending a location-request (LOC-REQ) message via the SS7 network to the HLR and receiving a response from the HLR indicating a point code (address) of the MSC. The SMS GW may then transmit the SMS message as an SMDPP message via the SS7 network to the MSC. And the MSC may forward the message via the BSC to the BTS for transmission over the CDMA air interface to the UE.

As noted above, a problem that can arise with this arrangement is that performing third-party registration of UEs with the SMS GW could result in a significant increase in traffic over the IMS, particularly if the IMS serves a large number of UEs or if a large number of UEs register with the IMS at or around the same time. In such a situation, the IMS could be flooded with third-party registration messages, perhaps resulting in the delay or loss of data due to network congestion.

And as further noted above, maintaining the UE-capability data in two separate databases, as is the case when third-party registration is employed, could result in the databases falling out of sync, possibly causing the SMS GW to rely on outdated UE-capability data. For instance, the UE-capability data stored in the SMS GW could indicate that the UE is capable of receiving SMS messages over IP when the UE is actually incapable of receiving SMS messages over IP. In such a scenario, the SMS GW could attempt and fail, perhaps a number of times, to transmit an SMS message to the UE over the LTE network before attempting to transmit the SMS message over the CDMA network. This could add significant delay to the transmission of the SMS message.

To help address these issues, the IMS could be configured in a manner that helps avoid performing third-party registration of UEs with the SMS GW. In the context of FIG. 1, when UE 18 registers with IMS 16, UE 18 could send UE-capability data to P-CSCF 40, P-CSCF 40 could pass the UE-capability data to S-CSCF 42, and S-CSCF 42 could pass the UE-capability data to HSS 44 where the UE-capability data could be stored for future reference. Unlike in a conventional IMS, S-CSCF 42 would not perform third-party registration with SMS GW 46 on behalf of UE 18. As such, S-CSCF 42 would not send the UE-capability data to SMS GW 46. In this scenario, when SMS GW 46 is presented with an SMS message destined to UE 18, SMS GW 46 could responsively query HSS 44 to obtain the UE-capability data.

After obtaining from HSS 44 the UE-capability data that UE 18 provided to the IMS during registration, SMS GW 46 could refer to this UE-capability data to determine whether to route the SMS message to UE 18 via an IP access network or rather via a non-IP access network. More specifically, if the UE-capability data indicates that UE 18 is capable of receiving SMS messages over IP, then SMS GW 46 could transmit the SMS message to UE 18 over LTE network 12. Otherwise, if the UE-capability data indicates that UE 18 is not capable of receiving SMS messages over IP, or does not indicate one way or another, then SMS GW 46 could transmit the SMS message to UE 18 over CDMA network 14.

Figure 2:
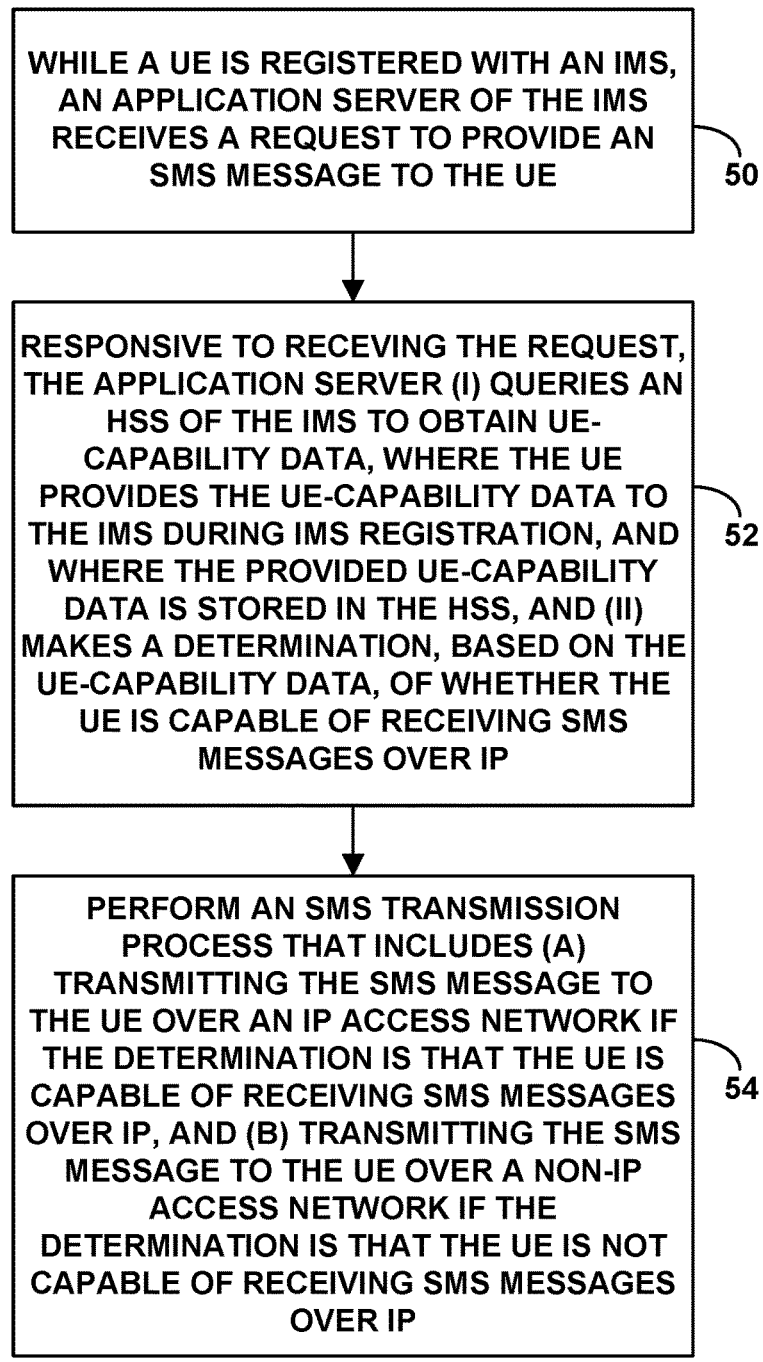
FIG. 2 is a flow chart depicting operations that can be carried out in accordance with the disclosure.

FIG. 2 is next a flow chart depicting operations that can be carried out in accordance with the discussion above to control routing of SMS messages to a UE registered with an IMS, where the IMS includes an application server (e.g., an SMS GW) and an HSS. As shown in FIG. 2, at block 50, the method involves, while the UE is registered with the IMS, the application server receiving a request to provide an SMS message to the UE. And at block 52, the method involves, responsive to receiving the request, the application server (i) querying the HSS to obtain UE-capability data, where the UE provides the UE-capability data to the IMS during IMS registration, and where the provided UE-capability data is stored in the HSS, and (ii) making a determination, based on the UE-capability data, of whether the UE is capable of receiving SMS messages over IP. At block 54, the method then involves the application server performing an SMS transmission process that includes (a) transmitting the SMS message to the UE over an IP access network (e.g., an LTE network) if the determination is that the UE is capable of receiving SMS messages over IP, and (b) transmitting the SMS message to the UE over a non-IP access network (e.g., a CDMA network) if the determination is that the UE is not capable of receiving SMS messages over IP.

In line with the discussion above, the UE-capability data could include information that indicates whether the UE is capable of receiving SMS messages over IP, such as information indicating a model type of the UE, whether the UE is provisioned with program instructions that when executed facilitate the UE receiving SMS messages over IP, or whether a processor of the UE is executing such program instructions. As such, the application server could determine that the UE is capable of receiving SMS messages over IP based on the UE-capability data indicating that the UE is (i) of a model type known to be capable of receiving SMS messages over IP, (ii) provisioned with program instructions for facilitating receipt of SMS messages over IP, or (iii) executing such program instructions. Similarly, the application server could determine that the UE is not capable of receiving SMS messages over IP based on the UE-capability data failing to indicate any of the above indications or indicating that the UE is (i) of a model type not known to be capable of receiving SMS messages over IP, (ii) not provisioned with program instructions for facilitating receipt of SMS messages over IP, or (iii) not executing such program instructions. Other examples are possible as well.

Further, as discussed above, the UE provides the UE-capability data to the IMS as part of the UE's registration with the IMS. For instance, the UE could transmit the UE-capability data via the IP access network to a P-CSCF, the P-CSCF could pass the UE-capability data to an S-CSCF, and the S-CSCF could pass the UE-capability data to the HSS.

As also discussed above, the act of the application server querying the HSS for the UE-capability data helps avoid performing a third-party registration process for registering the UE with the SMS GW, as this act obviates the process of storing the UE-capability data at the SMS GW.

Figure 3:
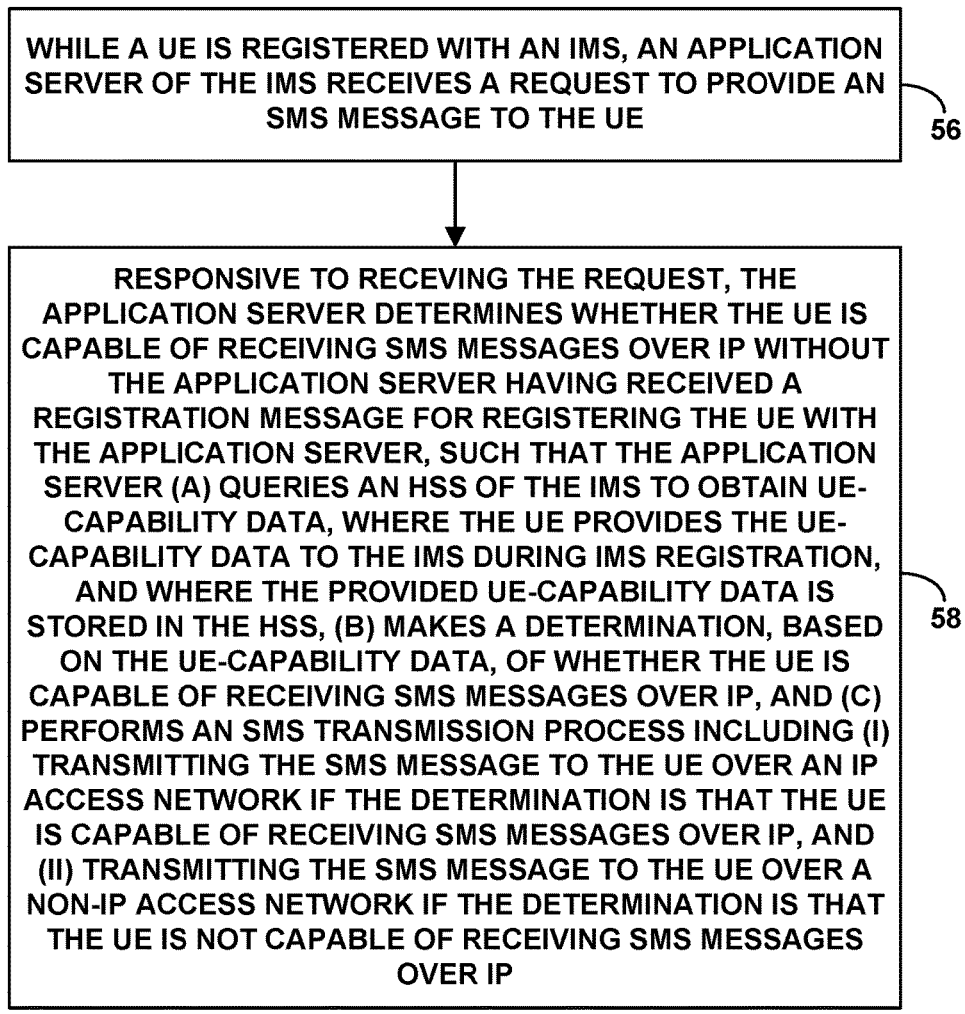
FIG. 3 is another flow chart depicting operations that can be carried out in accordance with the disclosure.

FIG. 3 is next another flow chart depicting operations that can be carried out in accordance with the discussion above to control routing of SMS messages to a UE registered with an IMS, where the IMS includes an application server (e.g., an SMS GW) and an HSS. As shown in FIG. 3, at block 56, the method involves, while the UE is registered with the IMS, the application server receiving a request to provide an SMS message to the UE. And at block 58, the method involves, responsive to receiving the request, the application server determining whether the UE is capable of receiving SMS messages over IP without the application server having received a registration message for registering the UE with the application server.

As further shown at block 58, in order to determine whether the UE is capable of receiving SMS messages over IP, the application server (a) queries the HSS to obtain UE-capability data, where the UE provides the UE-capability data to the IMS during IMS registration, and where the provided UE-capability data is stored in the HSS, (b) makes a determination, based on the UE-capability data, of whether the UE is capable of receiving SMS messages over IP, and (c) performs an SMS transmission process. The SMS transmission process includes (i) transmitting the SMS message to the UE over an IP access network (e.g., an LTE network) if the determination is that the UE is capable of receiving SMS messages over IP, and (ii) transmitting the SMS message to the UE over a non-IP access network (e.g., a CDMA network) if the determination is that the UE is not capable of receiving SMS messages over IP.

Figure 4:
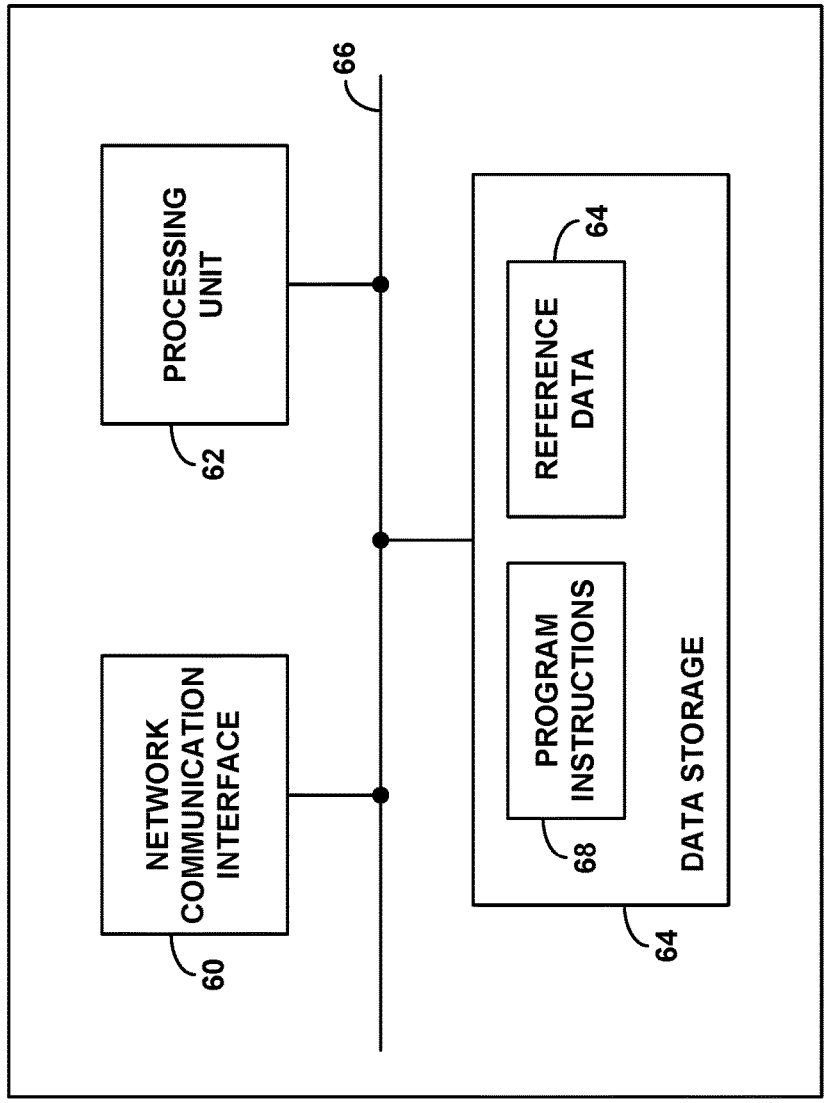
FIG. 4 is a simplified block diagram of an example node operable in accordance with the disclosure.

Finally, FIG. 4 is a simplified block diagram of a network node that can operate in the arrangement of FIG. 1 and in accordance with the discussion above. This network node could be representative of any of a variety of the nodes discussed above, such as an S-CSCF, an HSS, or an SMS GW, among others. As shown in FIG. 4, the node includes a network communication interface 60, a processing unit 62, and non-transitory data storage 64, all of which may be coupled together by a system bus, network, or other connection mechanism 66.

The network communication interface 60 includes one or more hardware ports for connecting with and facilitating communication with other nodes, examples being wired or wireless Ethernet ports for instance. The processing unit 62 then includes one or more general purpose processors (e.g., microprocessors) and/or special purpose processors (application specific integrated circuits, etc.) And the data storage includes one or more volatile and/or non-volatile storage components, such as magnetic, optical, or flash memory modules for instance. As further shown, the data storage may hold program instructions 68 and reference data 70. The program instructions could be executable by the processing unit 62 to carry out various operations as described above. And the reference data could comprise various data to facilitate operations as discussed above.

Exemplary embodiments have been described above. Those skilled in the art will understand, however, that changes and modifications may be made to these embodiments without departing from the true scope and spirit of the invention.

We claim:

1. A method for delivering a Short Message Service (SMS) message to a user equipment device (UE) that is registered with an Internet Protocol Multimedia Subsystem (IMS), the IMS including an application server and a home subscriber server (HSS), the method comprising:
   receiving, by the application server, a request to provide the SMS message to the UE;
   responsive to receiving the request, the application server (i) querying the HSS to obtain UE-capability data, wherein the UE provides the UE-capability data to the IMS during IMS registration, and wherein the provided UE-capability data is stored in the HSS, and (ii) making a determination, based on the UE-capability data obtained from the HSS, of whether the UE is capable of receiving SMS messages over Internet Protocol (IP); and
   performing an SMS transmission process comprising:
      (a) transmitting the SMS message to the UE over an IP access network if the determination is that the UE is capable of receiving SMS messages over IP, and
      (b) transmitting the SMS message to the UE over a non-IP access network if the determination is that the UE is not capable of receiving SMS messages over IP.

2. The method of claim 1, wherein the application server is a Short Message Service Gateway (SMS GW), and wherein the SMS GW querying the HSS to obtain the UE-capability data helps avoid third-party registration of the UE with the SMS GW.

3. The method of claim 1, wherein the UE-capability data indicates a model type of the UE, and wherein the determination is additionally based on the indicated model type of the UE.

4. The method of claim 1, wherein the UE-capability data indicates that the UE is provisioned with program instructions that when executed facilitate the UE receiving SMS messages over IP, and wherein, based on the UE-capability data indicating that the UE is provisioned with the program instructions, the determination is that the UE is capable of receiving SMS messages over IP.

5. The method of claim 1, wherein the UE-capability data indicates that the UE is not provisioned with program instructions that when executed facilitate the UE receiving SMS messages over IP, and wherein, based on the UE-capability data indicating that the UE is not provisioned with the program instructions, the determination is that the UE is not capable of receiving SMS messages over IP.

6. The method of claim 1, wherein the UE-capability data indicates that a processor of the UE is executing program instructions that facilitate the UE receiving SMS messages over IP, and wherein, based on the UE-capability data indicating that the processor of the UE is executing the program instructions, the determination is that the UE is capable of receiving SMS messages over IP.

7. The method of claim 1, wherein the UE-capability data indicates that a processor of the UE is not executing program instructions that facilitate the UE receiving SMS messages over IP, and wherein, based on the UE-capability data indicating that the processor of the UE is not executing the program instructions, the determination is that the UE is not capable of receiving SMS messages over IP.

8. An Internet Protocol Multimedia Subsystem (IMS) configured to control routing of Short Message Service (SMS) messages to a user equipment device (UE) that is registered with the IMS, the IMS including:

a home subscriber server (HSS) provisioned with UE-capability data, wherein the UE provides the UE-capability data to the IMS during IMS registration, and wherein the provided UE-capability data is stored in the HSS; and an application server operable to route SMS messages via an Internet Protocol (IP) access network and operable to route SMS messages via a non-IP access network, wherein the application server is configured to (i) receive a request to provide an SMS message to the UE, (ii) respond to the request by querying the HSS to obtain the UE-capability data, (iii) make a determination, based on the UE-capability data obtained from the HSS, of whether the UE is capable of receiving SMS messages over Internet Protocol (IP), and (iv) perform an SMS transmission process comprising:
  (a) transmitting the SMS message to the UE over the IP access network if the determination is that the UE is capable of receiving SMS messages over IP, and
  (b) transmitting the SMS message to the UE over the non-IP access network if the determination is that the UE is not capable of receiving SMS messages over IP.

9. The IMS of claim 8, wherein the application server is a Short Message Service Gateway (SMS GW), and wherein the SMS GW querying the HSS to obtain the UE-capability data helps avoid third-party registration of the UE with the SMS GW.

10. The IMS of claim 8, wherein the UE-capability data indicates a model type of the UE, and wherein the determination is additionally based on the indicated model type of the UE.

11. The IMS of claim 8, wherein the UE-capability data indicates that the UE is provisioned with program instructions that when executed facilitate the UE receiving SMS messages over IP, and wherein, based on the UE-capability data indicating that the UE is provisioned with the program instructions, the determination is that the UE is capable of receiving SMS messages over IP.

12. The IMS of claim 8, wherein the UE-capability data indicates that the UE is not provisioned with program instructions that when executed facilitate the UE receiving SMS messages over IP, and wherein, based on the UE-capability data indicating that the UE is not provisioned with the program instructions, the determination is that the UE is not capable of receiving SMS messages over IP.

13. The IMS of claim 8, wherein the UE-capability data indicates that a processor of the UE is executing program instructions that facilitate the UE receiving SMS messages over IP, and wherein, based on the UE-capability data indicating that the processor of the UE is executing the program instructions, the determination is that the UE is capable of receiving SMS messages over IP.

14. The IMS of claim 8, wherein the UE-capability data indicates that a processor of the UE is not executing program instructions that facilitate the UE receiving SMS messages over IP, and wherein, based on the UE-capability data indicating that the processor of the UE is not executing the program instructions, the determination is that the UE is not capable of receiving SMS messages over IP.

15. A method for delivering a Short Message Service (SMS) message to a user equipment device (UE) that is registered with an Internet Protocol Multimedia Subsystem (IMS), the IMS including an application server and a home subscriber server (HSS), the method comprising:
  receiving, by the application server, a request to provide the SMS message to the UE; and
  responsive to receiving the request, the application server determining, without the application server having received a registration message for registering the UE with the application server, whether the UE is capable of receiving SMS messages over IP, wherein determining whether the UE is capable of receiving SMS messages over IP comprises:
    (a) querying the HSS to obtain UE-capability data, wherein the UE provides the UE-capability data to the IMS during IMS registration, and wherein the provided UE-capability data is stored in the HSS,
    (b) making a determination, based on the UE-capability data obtained from the HSS, of whether the UE is capable of receiving SMS messages over IP, and
    (c) performing an SMS transmission process comprising:
      (i) transmitting the SMS message to the UE over an IP access network if the determination is that the UE is capable of receiving SMS messages over IP, and
      (ii) transmitting the SMS message to the UE over a non-IP access network if the determination is that the UE is not capable of receiving SMS messages over IP.

16. The method of claim 15, wherein the application server is a Short Message Service Gateway (SMS GW), and wherein querying the HSS to obtain the UE-capability data helps avoid third-party registration of the UE with the SMS GW.

17. The method of claim 15, wherein the UE-capability data indicates that the UE is provisioned with program instructions that when executed facilitate the UE receiving SMS messages over IP, and wherein, based on the UE-capability data indicating that the UE is provisioned with the program instructions, the determination is that the UE is capable of receiving SMS messages over IP.

18. The method of claim 15, wherein the UE-capability data indicates that the UE is not provisioned with program instructions that when executed facilitate the UE receiving SMS messages over IP, and wherein, based on the UE-capability data indicating that the UE is not provisioned with the program instructions, the determination is that the UE is not capable of receiving SMS messages over IP.

19. The method of claim 15, wherein the UE-capability data indicates that a processor of the UE is executing program instructions that facilitate the UE receiving SMS messages over IP, and wherein, based on the UE-capability data indicating that the processor of the UE is executing the program instructions, the determination is that the UE is capable of receiving SMS messages over IP.

20. The method of claim 15, wherein the UE-capability data indicates that a processor of the UE is not executing program instructions that facilitate the UE receiving SMS messages over IP, and wherein, based on the UE-capability data indicating that the processor of the UE is not executing the program instructions, the determination is that the UE is not capable of receiving SMS messages over IP.

* * * * *